United States Patent [19]

Koppelman et al.

[11] 4,220,458
[45] Sep. 2, 1980

[54] FILTER APPARATUS

[75] Inventors: Edward Koppelman, Encino; Robert G. Murray, Palo Alto; Charles E. Lapple, Los Altos Hills, all of Calif.; A. Kishan Rao, St. Louis, Mo.

[73] Assignee: KGM Associates, Encino, Calif.

[21] Appl. No.: 5,214

[22] Filed: Jan. 22, 1979

[51] Int. Cl.² .......................................... B01D 41/02
[52] U.S. Cl. .................................... 55/283; 55/294; 55/408; 55/474
[58] Field of Search ............... 55/283, 294, 302, 303, 55/466, 429, 400, 408, 474, 395; 210/268, 276, 265, 282

[56] References Cited

U.S. PATENT DOCUMENTS

| | | | |
|---|---|---|---|
| 2,455,561 | 12/1948 | Creelman | 55/465 |
| 2,834,720 | 5/1958 | Savoca | 210/268 X |
| 3,151,187 | 9/1964 | Comte | 210/268 X |
| 3,345,805 | 10/1967 | Sherrill | 55/294 X |
| 3,757,496 | 9/1973 | Berg | 55/294 X |
| 4,005,016 | 1/1977 | Haese | 210/268 |
| 4,035,170 | 7/1977 | Lear et al. | 55/474 |
| 4,142,873 | 3/1979 | Berz | 55/282 X |

*Primary Examiner*—John Adee
*Attorney, Agent, or Firm*—Harness, Dickey & Pierce

[57] ABSTRACT

A filter apparatus and filtering system which is particularly applicable for extracting particulated material from hot gases comprising a collector overlying a portion of the upstream face of the filter element for applying a reduced pressure to the particulate filter cake formed thereover to effect a dislodgement and recovery of the filtered particulate material. The collector is movable to progressively traverse substantially the entire upstream face of the filter element to effect a cleaning thereof by removal of the filter cake without interruption of the operation of the filtering system. The invention further encompasses a separator for cleaning the granular filter medium withdrawn from the filter apparatus and for recycling the cleaned filter medium back to the filter apparatus.

11 Claims, 8 Drawing Figures

FILTER APPARATUS

BACKGROUND OF THE INVENTION

A variety of filtration devices have heretofore been used or proposed for use in extracting finely divided particulate material entrained in gaseous streams. A prevalent problem associated with prior art filter devices is in the need for intermittently disrupting operation to enable a cleaning and removal of the filtered material from the filter element. A further problem has been the inability of such filter systems to effectively filter particulate matter from high temperature gas streams such as the gaseous effluent from coal gasification processes whereby the gaseous stream can be directly employed as a fuel for the operation of gas turbines without encountering damage to the operating components as a result of erosion and wear due to entrained abrasive particles. In some instances, it has been necessary to first cool the coal gasification product to a low temperature to enable filtration resulting in a substantial loss and waste of the sensible heat in the fuel gases.

Similar problems have also been encountered in connection with the recovery of finely particulated products in hot gaseous streams such as in the spray drying of various food products. The necessity to employ relatively low temperatures to accomodate the filtration system results in reduced efficiency of the spray drying process and in some instances also adversely effects the quality of the product. The relatively large volume of entrained solids in such spray drying processes necessitates frequent cleaning and removal of the filtered product from the upstream layer of the filter device which has occasioned frequent interruptions in the operation of such prior art systems further detracting from their efficiency.

Many of the problems and disadvantages associated with filtering systems of the types heretofore known are overcome in accordance with the filter apparatus and system of the present invention whereby gaseous streams can be efficiently and effectively subjected to filtration without prior cooling, whereby the filter cake accumulated on the filter element can be effectively and efficiently removed without interruption of the filtering operation, and wherein the filter medium itself can be periodically withdrawn, cleaned and recirculated back to the filter element.

SUMMARY OF THE INVENTION

The benefits and advantages of the present invention are achieved by a filter apparatus which comprises a housing defining a fluid passageway formed with a fluid inlet and a fluid outlet having a filter element therein which is interposed between the inlet and the outlet. A collector is positioned within the housing and is formed with an inlet port overlying a portion of and disposed contiguous to the upstream face of the filter element and the filtered particulate material in the form of a cake thereover. The collector includes discharge means for discharging the collected particulate material to a position exteriorly of the housing and is provided with a conduit in communication therewith for effecting a reduction in the fluid pressure therein below the fluid pressure in the housing of a magnitude sufficient to cause the particulate material adjacent to the inlet port to become dislodged from the upstream face of the filter element. Drive means are provided for effecting relative movement of the inlet port and the filter element in a manner to progressively traverse substantially the entire area of the upstream face for collecting the particulate material thereon.

In accordance with a further embodiment of the present invention, the filter element comprises a pair of foraminous walls between which a temperature resistant granular filter medium is disposed such as ceramic spherical particles. The filter chamber containing the filter medium is suitably connected to a discharge conduit through which the filter medium is periodically withdrawn and is passed through a separator including a gas jet oriented in a direction countercurrent or crossflow to the direction of travel of the filter medium for removing the fine sized particles from the surfaces thereof which are subsequently recovered. The granular filter medium in a cleaned condition is removed from the separator and recirculated to the filter chamber of the filtering system.

Additional benefits and advantages of the present invention will become apparent upon a reading of the description of the preferred embodiments taken in conjunction with the accompanying drawings.

DESCRIPTION OF THE PREFERRED EMBODIMENTS

Figure 1:
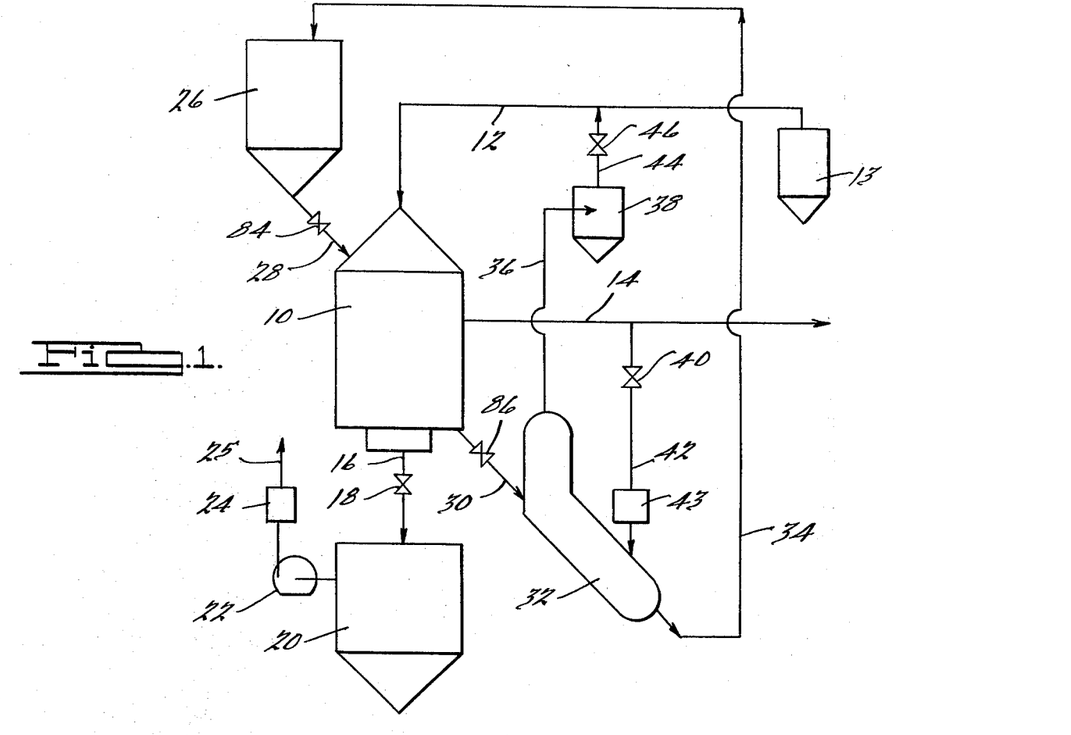
FIG. 1 is a schematic flow diagram of a filtering system incorporating the filter apparatus of the present invention.

Referring now in detail to the drawings and as best seen in FIG. 1, the filtering system of the present invention comprises a filter assembly 10 connected at its upper end to a gas inlet conduit 12 through which a gas is supplied containing entrained particulate matter. In those instances in which the gas contains large quantities of contaminating particles, it is preferred to first pass the gas stream through a preliminary course dust removal cyclone 13 in which most of the large particles are removed. A gas outlet conduit 14 is connected to the side portion of the filter assembly through which the filtered gas is discharged. A discharge conduit 16 is connected to the base of the filter assembly and is provided with a valve 18. The discharge conduit is connected at its lower end to a hopper 20 for storing the particulate material or product extracted from the gas stream. In the specific embodiment shown in FIG. 1, the hopper 20 is connected to a blower 22 for applying a reduced pressure to the interior of the hopper for the purposes subsequently to be described and the discharge of the blower is connected to a suitable bag filter 24 for extracting any entrained particulate matter in the exhaust gas stream. The gas discharged from the bag filter 24 through a conduit 25 may suitably be combined with the filtered gas in the outlet conduit 14 and may be repressurized, if desired.

A hopper 26 is disposed at an elevated position relative to the filter assembly 10 and contains a granular filter medium which is adapted to be periodically withdrawn through a supply conduit 28 for replacing the filter medium in the filter assembly. A discharge conduit 30 is connected to the lower portion of the filter assembly 10 for periodically withdrawing the granular filter medium from the filter assembly and for transferring the withdrawn filter medium to a separator 32 in which the contaminating particulate matter on the surfaces thereof is removed. The cleaned filter medium is recycled to the filter medium storage hopper 26 through a recycle conduit 34.

The cleaning of the filter medium in the separator 32 is effected by a high velocity jet in a manner to be more fully described in connection with FIGS. 4 and 5 and the entrained contaminating particles are withdrawn through a conduit 36 connected to the upper end of the separator 32 and are passed through a suitable cyclone or bag filter 38. The gas employed for cleaning the filter medium in the separator in accordance with a preferred practice of the present invention may comprise a portion of the filtered gas which is bled from the gas outlet conduit 14 through a valve 40, repressurized in compressor 43 and transferred through conduit 42 into the lower end portion of the separator. Similarly, the exhaust gas from the separator discharged from the cyclone or bag filter 38 can be returned to the gas inlet conduit 12 for admixture with the incoming gas to be filtered via a conduit 44 equipped with a valve 46. It will be apparent from the arrangement shown in FIG. 1, that the filtering system is adapted to operate on a continuous basis during which the filtered particulate matter in the incoming gas stream is intermittently or continuously removed from the filter element for collection in the hopper 20. Interruption of operation preferably is effected at periodic time intervals during which the granular filter medium is replaced in the filter assembly as a result of accumulation of particulate matter therein which may suitably be sensed by an increased pressure drop across the filter element.

Figure 2:
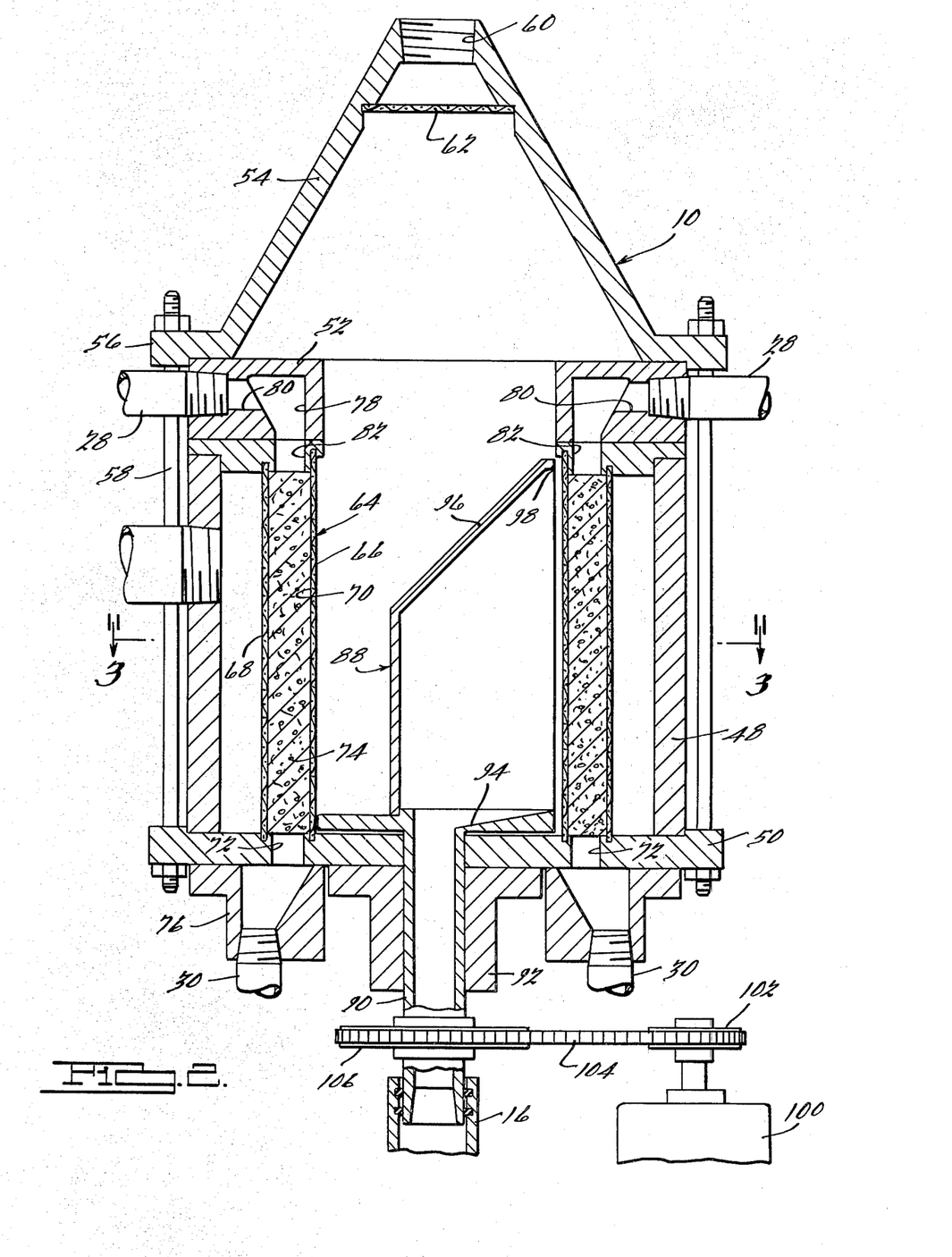
FIG. 2 is a vertical magnified sectional view of the filter apparatus shown in FIG. 1.
Figure 3:
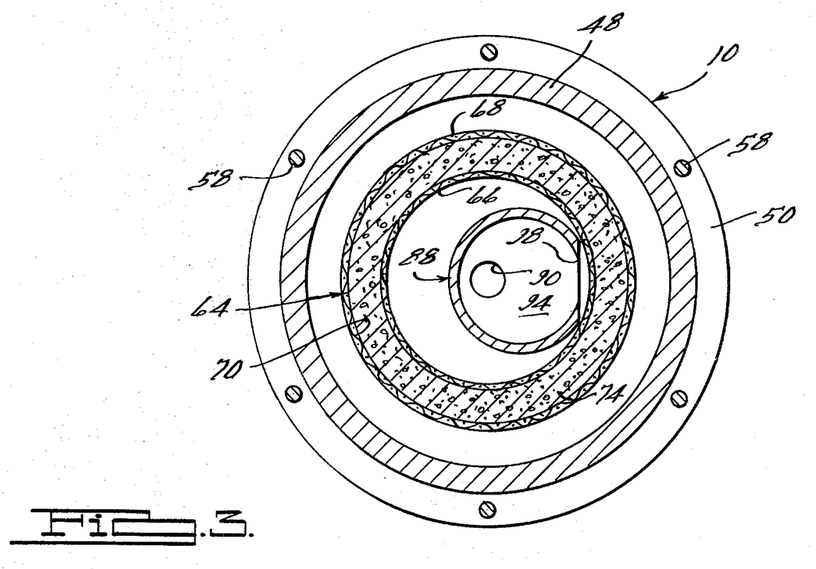
FIG. 3 is a transverse sectional view of the filter apparatus shown in FIG. 2 and taken substantially along the line 3—3 thereof.

Referring now to FIGS. 2 and 3 of the drawings, the filter assembly 10 comprises a three dimensional housing defining a passageway through which the incoming gas stream passes and in the specific preferred embodiment shown includes a circular cylindrical wall 48 which is supported at its lower end on a circular base or flange 50 and along its upper end portion by an annular manifold ring 52. A conical-shaped cover 54 formed with an annular flange 56 along its lower edge is disposed in overlying relationship on the upper edge of the manifold ring 52. The peripheral portion of the annular flange 56 and the base 50 are provided with apertures for receiving the ends of through-bolts or tie rods 58 for removably clamping the assembly together.

The upper end portion of the cover 54 is provided with an inlet port 60 which is connected to the gas inlet conduit 12 (FIG. 1) for introducing the gas stream to be filtered into the housing. A foraminous plate or screen 62 is mounted downstream of the inlet port 60 which acts as a diffusor for uniformly distributing the incoming gas over the upstream face of a filter element 64 and for further effecting an agglomeration of the particulate entrained matter therein facilitating filtration thereof.

The filter element 64 is comprised of an inner foraminous wall or screen 66 and an outer foraminous wall or screen 68 which are of a circular cylindrical configuration and are disposed concentric to each other defining therebetween a filter chamber 70. The base 50 and the manifold ring 52 are suitably grooved as shown in FIG. 2 to slidably receive and retain the lower and upper edges, respectively, of the walls 66, 68 in appropriate spaced position. The circular base 50 is provided with a plurality of outlet ports 72 at circumferentially spaced intervals which are disposed in communication with the lower end of the filter chamber 70 providing for a gravitational discharge of the granular filter medium 74 from the chamber into an annular discharge manifold 76 affixed to the lower side of the base. The discharge manifold 76 is in turn connected to one or a plurality of discharge conduits 30 (FIG. 1) for transferring the withdrawn filter medium to the separator. The upper annular manifold ring 52 is formed with an annular chamber 78 which is disposed in communication with a plurality of inlet ports 80 disposed at circumferentially spaced intervals which in turn are connected to one or a plurality of supply conduits 28 (FIG. 1) for receiving granular filter medium from the filter medium storage hopper. The base of the annular manifold ring is formed with a plurality of circumferentially spaced discharge ports 82 for discharging the filter medium by gravity into the upper end of the filter chamber 70. The introduction of cleaned filter medium and the withdrawal of filter medium from the filter chamber 70 is controlled by means of valves 84, 86 as shown in FIG. 1 located in the supply conduit 28 and discharge conduit 30, respectively. The replenishment of the filter medium is performed periodically in consideration of the accumulation of particulate matter in the interstices thereof as evidenced by an increase in the pressure drop across the filter element. The time interval between changes of the filter medium will vary in consideration of the quantity of particulate matter in the incoming gas stream, its size and size distribution, the distance between the inner and outer foraminous walls defining the depth of the filter element, the size and configuration of the filter medium and the operating pressure of the filtration system.

The filter medium itself can comprise any particulate material which preferably is of a spherical shape and of substantially the same size to provide for uniformity in the porosity of the filter element along its length and depth. Preferably the filter medium is comprised of a temperature resistant material such as ceramic pellets which are able to withstand the high temperature of the gas stream being filtered. The operating temperature range of the filter system can range from about room temperature up to the design limits of the supporting metal structure. For example, gas streams derived from coal gasification processes which can satisfactorily be handled in accordance with the present invention can broadly range from about 100° F. to as high as about 1800° F. The foraminous inner and outer walls 66, 68 similarly are comprised of a high temperature resistant material such as stainless steel or nickel base alloys and may be in the form of a screen or perforated metal sheet.

In accordance with a preferred practice, the filter medium comprises spherical particles which may range in diameter from about 0.02 inch up to about 0.25 inch and which are all of substantially the same size. The depth of the filter element through which the gas passes may range from about ⅛ inch up to about 6 inches and preferably from about 1 to about 2 inches depending upon the particular flow rate of the gas stream and the nature or characteristics of the particulate matter therein.

In accordance with a preferred practice, there is a controlled relationship between the diameter of the spherical filter medium and the thickness of the filter bed with respect to pressure drop, ease of cake initiation and particulate collection efficiency. When the filter is clean, that is before any cake formation has taken place, there is some penetration of the particles into the bed of filter medium before the cake is formed. Generally, a range of 20 up to about 100 layers of spheres, and preferably from about 30 to about 50 are employed to maintain high collection efficiency without undue pressure drop across the filter element. During a filtration cycle, once the filter cake or layer is initiated, the filter cake itself acts as the filter and very few particles enter the filter medium. However, some time period is required for the cake to be formed, and it is during this cake build up period that most particles get into the filter medium bed. It has been observed that particles that are retained in the filter bed are from about 2 to about 3 orders of magnitude smaller than the filter medium spheres; that is, when the filter medium is from about 1 to about 5 millimeters in diameter, the dust or particulate material entering the media range from about 0.2 to about 5 microns, respectively, and these particles are collected because they adhere to the filter medium or to the other particles previously deposited on the filter medium. As the gas and entrained particles enter the filter bed during cake formation, each layer of spherical filter medium catches a percentage of the entrained particles entering that layer. For example, 80% of such contaminating particles are entrapped in the first layer while 80% of the escaping particles, or 16%, are entrapped in the second layer, etc. The foregoing relationship is generally true in those instances in which all of the contaminating particles are of substantially the same size and shape. It will be appreciated, that smaller particles tend to penetrate further through the filter bed. Eventually, a sufficient quantity of particles penetrate through all of the layers of the filter medium bed at which point some of such particles escape into the filtered gas on the downstream side of the filter bed. At that point, the filter medium must be replaced with a fresh charge of cleaned spherical filter medium. Once a filter cake of significant thickness is established, the entry of contaminating particles into the filter medium is substantially reduced. As the filter cake increases in thickness, a pressure drop across the filter cake increases in a manner approximately proportional to the thickness of the accumulated cake. In order to avoid excessive pressure drop as a result of cake build up, the filter cake is continuously or intermittently removed to maintain efficiency of the filtering operation. After the removal of the filter cake from a selected portion of the upstream side of the filter element, a new filter cake builds up during which some further penetration of contaminating particles into the filter bed occurs. Ultimately, the pressure drop across the filter element is not appreciably lowered by filter cake removal due to the accumulation of contaminating particles within the interstices of the filter medium itself at which point the filter medium is replaced with a fresh batch.

As best seen in FIGS. 2 and 3, a collector assembly 88 is rotatably mounted within the housing and includes a tubular shaft 90 connected by means of a sealed slip connection to the discharge conduit 16 (FIG. 1). The tubular shaft is journaled in a stepped collar 92 affixed to the underside of the base 50 defining a rotational axis coinciding with the center of curvature of the inner wall 66 of the filter element.

The tubular shaft 90 terminates at its upper end in a circular flange 94 the lower surface of which is disposed in sliding bearing contact against the upper surface of the base 50. A shroud or baffle 96 in the shape of a horn is affixed to the upper surface of the flange 94 and terminates along its outer periphery in a collector port 98 the edges of which are disposed contiguous to the inner foraminous wall 66 and the accumulation of particulate matter in the form of a filter cake on the upstream face of the filter element.

The circumferential width of the collector port 98 can be varied to encompass from about 5% to as much as about 25% of the area of the upstream face of the filter element. The collector port 98 is of a height to substantially overlie the entire height of the upstream filter face. While circumferential widths of the collector port greater than about 25% can be employed, the use of collector assemblies of such increased area reduces the available effective area of the filter element reducing the filtering capacity of the system without providing for any material advantages. Generally the area of the collector port relative to the area of the upstream face of the filter element is controlled within a range of about 5% to about 10%.

The collector assembly 88 serves to effectively remove the filtered material or cake from the upstream face of the filter element by an intermittent application of a reduced pressure to the filter cake causing a dislodgement thereof and is recovered within the interior of the baffle. The high efficiency of filter cake removal in accordance with the present invention is believed to result from the sudden reduction in pressure adjacent to the powder cake whereby the cake and the gas entrapped therein momentarily expands causing simultaneous cake expansion and breakup accompanied by a blowback or puffback caused by the expanding gas in the filter medium. The dislodged cake fragments drop through the influence of gravity and gas flow into the interior of the collector assembly which is sloped to facilitate transfer thereof to the tubular shaft 90, discharge conduit 16 to the collector hopper.

The imposition of reduced pressure to the interior of the collector assembly adjacent to the filter cake can be effected when the filter system is operated under high pressure, for example, above about 2 atmospheres by simply venting the interior of the collector assembly to the hopper at atmospheric pressure by opening the valve 18 (FIG. 1) of the discharge conduit 16. When the filter system operates at or about atmospheric pressure, the reduced pressure is effected by operation of the blower 22 (FIG. 1) to provide a sufficient pressure reduction to effect cake dislodgment. Ordinarily, a pressure reduction of a magnitude of 2 is sufficient to effect substantially complete removal of the accumulated cake. For example, with the gas inlet pressure at a magnitude of about 2 atmospheres, the application of atmospheric pressure to the interior of the collector assembly is adequate.

The progressive movement of the collector assembly across the upstream face of the filter element can be performed continuously by a slow incremental rotation or intermittently by an indexing of the collector assembly from one overlying location to the next overlying location. Preferably the collector assembly is intermittently advanced and the reduction in pressure within the interior thereof is effected on a pulsed basis after attaining the new position. Appropriate indexing movement of the collector assembly can be achieved such as shown in FIG. 2 by means of a variable speed motor 100 having a drive sprocket 102 affixed to the output shaft thereof which is drivingly connected to a roller chain 104 which in turn is trained about a driven sprocket 106 affixed to the tubular shaft 90. The frequency at which the collector assembly is advanced can be varied in accordance with the rate of build up of powder cake on the upstream face of the filter element. The specific schedule of cake removal depends on the severity of service, type of service, allowable increase in pressure drop occasioned by the cake build up and other related factors. Typically for the extraction of particulate contaminants from a coal gasification product stream, operating at about 2 atmospheres of pressure and at a temperature of about 1600° F., a schedule of about from 1 to about 6 complete revolutions of the collector assembly per hour is satisfactory. With the circumferential width of the collector port being about 60°, 84% of the upstream face of the filter element is available for filtration. The indexing of the collector assembly accordingly can be effected in 60° increments requiring 6 advances to complete one revolution.

Figures 4, 5:
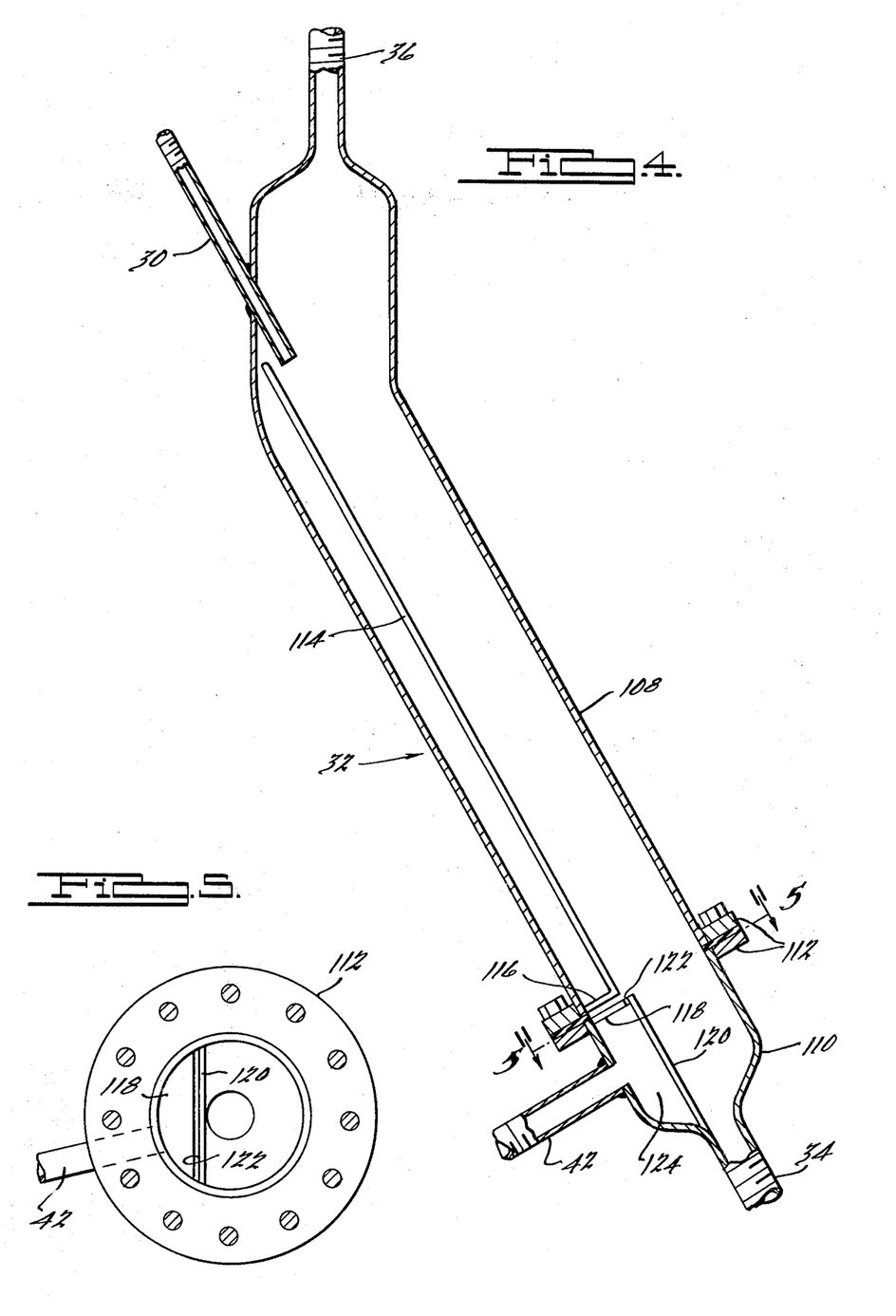
FIG. 4 is a magnified vertical sectional view of the separator employed in the filtering system illustrated in FIG. 1.
FIG. 5 is a transverse sectional view of the separator shown in FIG. 4 and taken substantially along the line 5—5 thereof.

Referring now in detail to FIGS. 4 and 5 of the drawings, the separator 32 for cleaning the filter medium comprises an elongated tubular housing 108 the major length of which is angularly inclined and terminates in a substantially upright top portion which is connected to the exhaust conduit 36 (FIG. 1). The lower end portion of the housing is formed with a removable section 110 which is connected to the main housing 108 by means of annular flanges 112. A flat plate or ramp 114 is affixed to the interior of the housing 108 along which the filter medium moves downwardly by the action of gravity in the form of a layer on being introduced into the separator by the discharge conduit 30 (FIG. 1). The lower portion of the housing 118 below the ramp 114 is sealed adjacent to the flange 112 by an arcuate section 116.

The lower section 110 of the separator is formed with an arcuate segment 118 the upper face of which is disposed substantially flush with the face of the adjacent annular flange 112. A plate or ramp section 120 is affixed to the interior of the lower section in spaced relation with respect to the upper edge of the arcuate section 118 defining therebetween an orifice or slit 112 the axis of which is oriented along the upper surface of the main ramp 114. The ramp section, arcuate segment and adjacent wall of the lower section 110 define in combination a manifold chamber 124 which is connected to the conduit 42 (FIG. 1) for supplying a high pressure gas which is discharged in the form of a planar jet through the slit 122 in a direction countercurrent to the downward travel of the filter medium along the upper surface of the ramp 114. The impingement of the gaseous jet on the surfaces of the filter medium effects removal of minute particles of contaminants thereon which are entrained in the gas stream and pass upwardly and outwardly of the housing through the exhaust conduit 36. In accordance with a preferred construction, the lower edge of the orifice or slit 122 is positioned in alignment with the upper surface of the ramp 114. The filter medium upon passing beyond the gaseous jet travel downwardly by gravity along the ramp section 120 and are removed from the separator through the recycle conduit 34 for return to the filter medium storage hopper 26 (FIG. 1).

In accordance with a specific embodiment of the separator shown in FIGS. 4 and 5, the housing 108 is 6 inches in diameter and filter medium is introduced through the inlet conduit 30 at a rate of about 2 pounds per minute at a velocity of about 70 feet per second. The slit is of a width of 0.020 inch and the cleaning gas is introduced into the manifold chamber at a rate of 23 cubic feet per minute for discharge from the slit. The fine particulate contaminants are blown off the surfaces of the filter medium and pass upwardly through the separator chamber out through the exhaust conduit 36. When the cleaning gas comprises a high temperature gas such as derived from a coal gasification process, the cleaning operation is performed employing hot gases at a temperature at least above that which would occasion any condensation to form due to the moisture and other volatile content in the gas stream.

Figures 6, 7, 8:
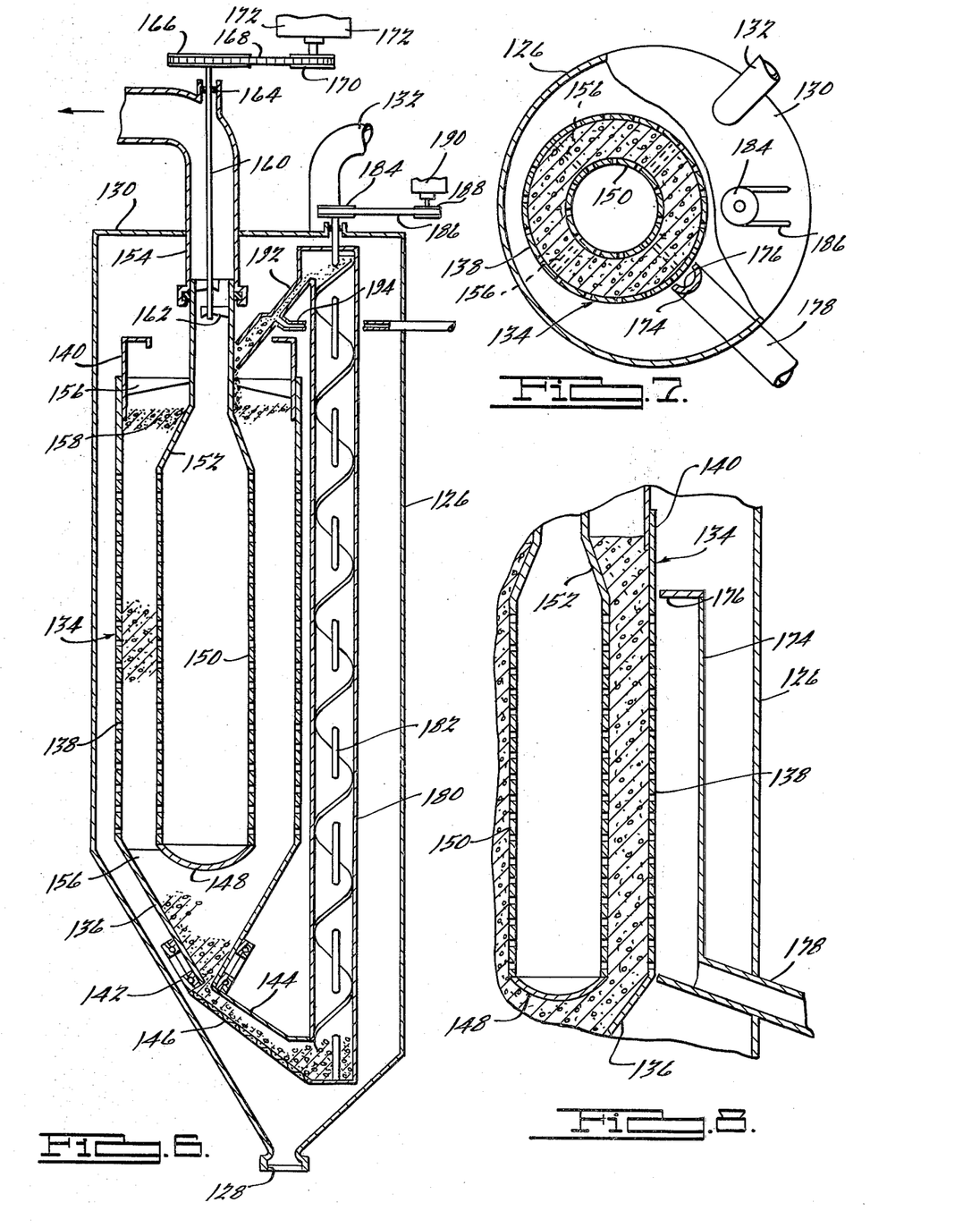
FIG. 6 is a fragmentary side elevational view partly in section of a filter apparatus constructed in accordance with an alternative satisfactory embodiment of the present invention.
FIG. 7 is a plan view partly in section of the filter apparatus shown in FIG. 6.
FIG. 8 is a fragmentary vertical sectional view similar to FIG. 6 and illustrating the disposition of the collector manifold along the upstream side of the filter element.

Referring now to FIGS. 6–8 of the drawings, an alternative satisfactory embodiment of the filter system is illustrated in which the filter medium separation and recycling system is self-contained and in which the filter element rotates relative to the stationary collector assembly. As shown, the filter apparatus comprises a cylindrical plenum 126 defining a chamber and which is tapered along its lower portion terminating in an outlet port 128 which is adapted to be connected to a discharge conduit such as the discharge conduit 16 of FIG. 1 equipped with a valve 18 and a bag filter for recovering the particulated material discharged therethrough. The plenum 126 is closed at its upper end by means of a circular top wall 130 to which a gas inlet conduit 132 is connected through which a gas containing entrained particulate matter is introduced into the interior of the plenum. The gas inlet conduit 132 corresponds to the conduit 12 of FIG. 1 and may also be suitably provided with a cyclone such as the cyclone 13 of FIG. 1 to effect a preliminary removal of course particulate matter from the incoming gas stream.

A rotary filter assembly 134 is disposed within the plenum 126 and is mounted for rotation about a substantially vertical axis. The filter assembly comprises an outer element comprising a lower impervious conical wall portion 136, a foraminous or porous intermediate cylindrical wall portion 138 and an upper cylindrical imperforate wall portion 140. The lower conical wall portion 136 is rotatably supported in a conical bearing 142 connected by a spider (not shown) to the interior wall of the plenum 126. The base of the conical wall portion terminates in an outlet connected by a slip connection to a filter medium discharge conduit 144 which extends downwardly toward the base of the plenum. The discharge conduit 144 is equipped with a screen element 146 along the lower portion thereof for permitting entrained particulate matter to fall downwardly through the action of gravity toward the outlet port 128 while retaining the granular filter medium within the conduit.

The filter assembly further includes an inner element disposed concentrically within the outer element and including an imperforate dish-shaped base 148, a cylindrical foraminous or porous intermediate section 150 which extends longitudinally of and for substantially the same length as the foraminous cylindrical wall portion 138 of the outer element, and an imperforate tapered tubular upper wall section 152. The upper tubular end of the wall portion 152 is connected by means of a sealed slip joint to a stationary outlet conduit 154 through which the filtered gas is discharged. The inner filter element and outer filter element are maintained in appropriate concentric spaced relationship and are drivingly coupled together by means of a plurality of baffles or webs 156 extending axially and radially therebetween and are of a configuration to minimize any interference with the downward gravitational flow of the granular filter medium 158 interposed between the inner and outer filter elements. The radial distance between the inner and outer filter elements of the rotary filter assembly 134 can be controlled to achieve the desired depth of the filter medium in consideration of the parameters previously discussed in connection with the embodiment illustrated in FIG. 2.

A controlled continuous or intermittent rotation of the filter assembly is achieved as best seen in FIG. 6 by a coaxial shaft 160 extending vertically through the gas outlet conduit 154 and secured by means of a spider 162 to the upper wall portion 152 of the inner element. The shaft 160 extends through a rotary seal 164 provided in the wall of the outlet conduit and is connected at its upper end to a sprocket 166 affixed thereto. The sprocket 166 is connected by means of a roller chain 168 to a driven sprocket 170 affixed to the output shaft of a variable speed electric motor 172.

In accordance with the foregoing arrangement, a slow incremental rotation or an intermittent indexing of the filter assembly is effected in a manner similar to that previously described in connection with the collector assembly 88 of the embodiment shown in FIG. 2. The rotation of the filter assembly causes the upstream face thereof incorporating the powdered filter cake thereover to be advanced adjacent to a collector manifold 174 stationarily positioned adjacent to a circumferential portion of the upstream face. As may be best seen in FIGS. 7 and 8, the collector manifold 174 is of a generally semi-circular cross-section and is formed with an elongated rectangular collector port 176 which overlies a circumferential section of the foraminous intermediate wall portion 138 of the outer element of the filter assembly. The upper end of the collector manifold is closed while the lower portion thereof terminates and is disposed in communication with a downwardly angularly inclined discharge conduit 178 which is connected to a storage hopper system (not shown) similar to the hopper 20 schematically illustrated in FIG. 1. The imposition of a reduced pressure to the interior of the collector manifold effects a dislodgement and recovery of the particulated filter cake on the adjacent upstream face of the filter assembly in accordance with the parameters and mode of operation as previously described in connection with the collector assembly 88 of FIG. 2.

The embodiment shown in FIGS. 6–8 includes an integrated self-contained filter medium cleaning and recirculation system as a satisfactory alternative to the external separater 32 and recycle conduit previously described in connection with FIGS. 1 and 5. As shown, the lower end of the filter medium discharge conduit 144 is disposed in communication with a vertically oriented conveyer tube 180 within which a screw conveyer 182 is rotatably mounted. The upper end of the shaft of the screw conveyer 182 projects outwardly of the top wall 130 of the plenum and a suitable driven sprocket 184 is affixed thereto. The driven sprocket is drivingly coupled by means of a roller chain 186 to a drive sprocket 188 mounted on the output shaft of a variable speed electric motor 190. The upper portion of the conveyer tube 180 is formed with an outlet or discharge chute 192 for discharging the granular filter medium into the annular region between the inner and outer filter elements.

As best seen in FIG. 6, the discharge chute 192 is formed with a conduit 194 the discharge end of which transversely intersects the axis of the chute and the granular medium discharged therethrough. The conduit 194 is adapted to be connected to a high pressure source of air such as the conduit 42 and compressor 43 illustrated in FIG. 1 which is discharged in the form of a jet in impinging relationship against the filter medium particles to effect a removal of the minute particulate contaminants thereon. The contaminating particles removed become entrained in the cleaning jet gas stream and are transferred through the discharge end of the chute into the interior of the plenum for passage through the filter assembly. The cleaned filter medium in turn passes downwardly through the action of gravity and is discharged into the upper end of the filter assembly.

The operation and recycling of the filter medium including a separation and cleaning thereof is performed in consideration of the same parameters as previously discussed in connection with the system shown in FIG. 1. Accordingly, when the pressure drop across the filter medium attains a preselected level indicative of entrappment of filtered particles within the interstices of the granular filter medium, the motor 190 is energized effecting upper conveyance of filter medium through the conveyer tube which is accompanied by a downward gravitational movement of the filter medium in the annular region of the filter assembly and through the discharge conduit 144. As previously mentioned, the provision of the screen element 146 in the medium discharge conduit effects a preliminary separation of entrained contaminating particles from the filter medium which are recovered through the discharge port 128. The remaining contaminating particles are removed by the cleaning action of the gas jet in the discharge chute 192. The recirculation and cleaning action of the filter medium is continued until the entire internal portion of the filter assembly has been replenished with cleaned filter medium.

It will be noted in FIG. 6, that the depth of the filter medium 158 within the annular region between the inner and outer filter elements is controlled so as to provide a depth above the upper ends of the foraminous intermediate wall portions 138 and 150 greater than the radial depth of the filter medium between the inner and outer filter elements. This results in an increased resistance against axial flow of gas within the plenum downwardly through the open end of the outer filter element and preferentially induces flow in a radial inward direction from the foraminous outer wall portion 138 through the annular filter medium and through the inner foraminous wall section 150 and thence outwardly through the gas outlet conduit 154.

While the recycling, cleaning and replenishment of the filter medium in the two embodiments shown in the drawings can be performed without interruption of the filtration cycle, it is also contemplated that a plurality of individual filter assemblies can be employed which are connected in parallel to enable individual ones to be disconnected temporarily from the inlet gas flow during periods in which the filter medium is being changed. This provides for further assurance that no contaminating particles pass through the filter assembly and remain entrained in the outlet gas product.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A filter apparatus for extracting particulate matter from a fluid comprising means defining a fluid passageway formed with a fluid inlet and a fluid outlet, a filter element disposed in said passageway between said inlet and said outlet and in intercepting relationship relative to the fluid passing therethrough, said filter element comprising a pair of spaced apart substantially circular cylindrical concentric foraminous walls defining therebetween an annular filter chamber, a particulated granular filter medium in said filter chamber, a supply conduit disposed in communication with said filter chamber for introducing said filter medium thereto and a discharge conduit disposed in communication with said filter chamber at a position remote from said supply conduit for withdrawing said filter medium therefrom, separator means in communication with said discharge conduit for separating said filter medium from any entrained particulate filtered material, conveying means for recirculating the separated said filter medium to said supply conduit, collector means formed with an inlet port overlying a portion of and disposed contiguous to the upstream face of said filter element and the filtered particulate material formed thereover, said collector means including discharge means for discharging the collected particulate material to a position exteriorly of said passageway, conduit means connected to the interior of said collector means for effecting a reduction in the fluid pressure therein below the fluid pressure in said passageway of a magnitude sufficient to cause the particulate material adjacent to said inlet port to be dislodged from said upstream face, and drive means for effecting relative movement between said collector means and said filter element in a manner to progressively traverse substantially the entire area of said upstream face for collecting the particulate material thereon.

2. The filter apparatus as defined in claim 1 in which said conduit means includes control means for effecting the reduction in pressure in the interior of said collector means on an intermittent pulsed sequence.

3. The filter apparatus as defined in claim 1 in which said drive means is operable for effecting relative movement between collector means and said filter element on an intermittent basis.

4. The filter apparatus as defined in claim 1 in which said drive means is operable for effecting relative movement between said collector means and said filter element on a continuous basis.

5. The filter apparatus as defined in claim 1 in which the surface of the inner of said cylindrical walls comprises said upstream face.

6. The filter apparatus as defined in claim 5 in which said collector means is rotatably mounted for rotation about the longitudinal axis of curvature of said upstream face.

7. The filter apparatus as defined in claim 1 in which the surface of outer one of said cylindrical walls comprises said upstream face.

8. The filter apparatus as defined in claim 7 in which said collector means is stationarily mounted adjacent to said upstream face and said filter element is rotatably mounted about the longitudinal axis of curvature of said upstream face.

9. The filter apparatus as defined in claim 1 further including diffuser means in said passageway disposed downstream of said fluid inlet for uniformly distributing the flow of fluid across the upstream face of said filter element and for effecting an agglomeration of particulate entrained matter.

10. The filter apparatus as defined in claim 1 in which said filter medium comprises spherical-shaped ceramic particles of an average diameter of about 0.02 to about 0.25 inch.

11. The filter apparatus as defined in claim 1 in which said filter chamber is oriented in a substantially upright position and said supply conduit is connected to the upper portion thereof and said discharge conduit is connected to the lower portion thereof.

* * * * *